United States Patent [19]

Kudelski et al.

[11] Patent Number: 4,459,604
[45] Date of Patent: Jul. 10, 1984

[54] MULTICOLOR RECORDING CARRIER AND METHOD OF RECORDING

[75] Inventors: Stefan Kudelski, Le Mont-sur-Lausanne; Jean-Claude Schlup, Cheseaux-sur-Lausanne, both of Switzerland

[73] Assignee: Robert Bosch GmbH, Stuttgart, Fed. Rep. of Germany

[21] Appl. No.: 222,998

[22] Filed: Jan. 6, 1981

[51] Int. Cl.³ .................... G01D 15/08; G01D 15/34
[52] U.S. Cl. ................................. 346/163; 346/135.1
[58] Field of Search ...................... 346/157, 162–164, 346/135.1; 358/297–300; 355/4; 428/457

[56] References Cited

U.S. PATENT DOCUMENTS

| | | | |
|---|---|---|---|
| 2,961,287 | 11/1960 | Zabriskie et al. | 346/163 X |
| 3,434,878 | 3/1969 | Reis . | |
| 3,679,818 | 7/1972 | Courtney-Pratt | 346/76 L |
| 3,789,425 | 1/1974 | Matsushima . | |
| 3,995,083 | 11/1976 | Reichle . | |
| 4,007,489 | 2/1977 | Helmberger et al. | 346/157 |
| 4,104,648 | 8/1978 | Blumenthal et al. | 346/163 |
| 4,307,165 | 12/1981 | Blazey et al. | 355/4 X |

FOREIGN PATENT DOCUMENTS

| | | |
|---|---|---|
| 1020261 | 11/1957 | Fed. Rep. of Germany . |
| 1054323 | 4/1959 | Fed. Rep. of Germany . |
| 2241925 | 4/1974 | Fed. Rep. of Germany . |
| 2503016 | 7/1976 | Fed. Rep. of Germany . |
| 1593574 | 7/1981 | United Kingdom . |

OTHER PUBLICATIONS

IBM Technical Disclosure Bulletin, vol. 24, No. 2, Jul. 1981, "Multi-Color Recording Medium" by D. J. Hall et al.-p. 1259.

Primary Examiner—Thomas H. Tarcza
Attorney, Agent, or Firm—Frishauf, Holtz, Goodman, Woodward

[57] ABSTRACT

To record images, including multicolor representation of colored images on electrosensitive coated paper in which a metallized coating is burned off from a substrate which may be either transparent or opaque, color element information is applied to the substrate, for example in form of dots, so that electrodes traveling across the substrate, or a comb electrode with multiple electrode tips, suitably energized, can expose, by burning off of the metallized coating, the underlying color dot. The color dots can be prepared in accordance with the well-known television color pattern or by applying yellow, green and red dots, in recurring periodic sequence, along the line to be scanned. For alignment of the recording head with the respective dot, markers are preferably provided on both sides of a recording strip, so that synchronization between recording pulses and actual color dots on the paper is obtained in spite of variations of the paper from a standard, occasioned, for example, by dampness or moisture absorbed by the paper.

23 Claims, 8 Drawing Figures

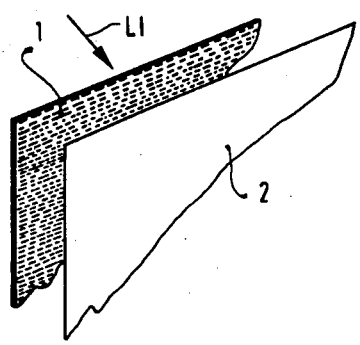
Fig. 1
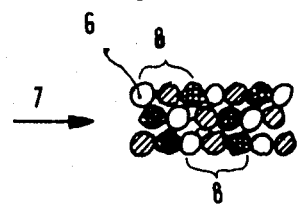
Fig. 3
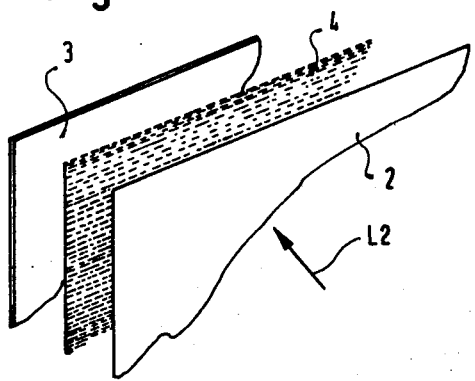
Fig. 2
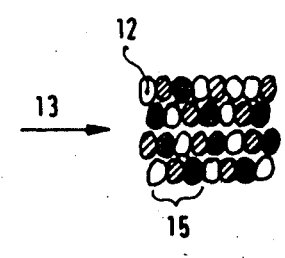
Fig. 4
Fig. 5
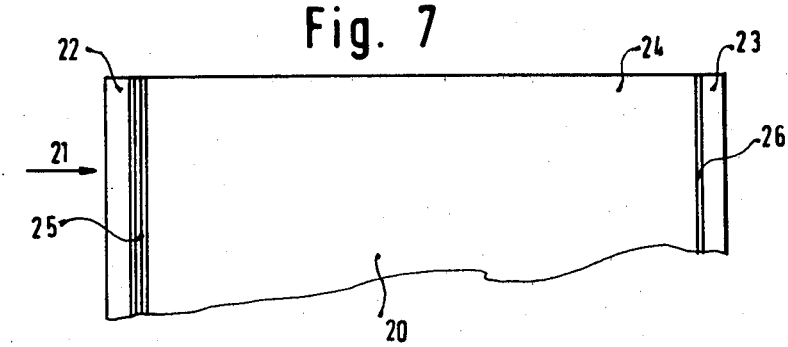
Fig. 7

MULTICOLOR RECORDING CARRIER AND METHOD OF RECORDING

The present invention relates to a method of recording in color on a recording carrier in which the recording carrier has a metalized coating which is selectively removed by burning-out by electrical energy; and to a recording carrier in which this method is carried out.

BACKGROUND AND PRIOR ART

Various methods to record on a recording carrier, such as paper or plastic film, typically Mylar, Reg. TM for oriented polyester film are known; in one such method, a recording carrier is used which has a substrate of paper or Mylar, (Reg. TM) which is metalized. The substrate is moved beneath a writing electrode, for example a plurality of comb-like projections which engage closely adjacent spots on the carrier and which are selectively energized as the carrier is moved beneath the comb-like array of the electrodes by a transport mechanism, for example a roller or the like. As current pulses are applied to the respective selected electrodes, the metal cover on the substrate is removed, leaving the substrate exposed. To provide for good legibility, it has been proposed to coat the substrate with a lacquer or ink which can be applied, for example, by a printing method. Record carriers which are to be looked at from the top usually have a substrate which is opaque, for example paper; if the recording on the record paper is to be read by transmission, the substrate is usually transparent, for example a transparent plastic film of Mylar.

The electrical pulses applied to the comb-electrode array burn off a pattern of points or lines from the surface of the substrate recording carrier in order to provide a corresponding image of the original, for example by generating a predetermined dot configuration or line configuration, as the carrier is moved perpendicularly with respect to the lateral extent of the comb-electrode array.

The recording carriers are usually in the form of sheets or tapes. The electrosensitive coating thereon may be zinc, aluminum, or a zinc-cadmium alloy, and applied on the electrically insulating substrate in a vacuum by vapor deposition. The pattern to be reproduced is burned in by the respectively energized writing electrodes positioned, for example, in a straight line across which the substrate carrier is pulled. The respective comb electrodes are appropriately energized from an electical energy source in accordance with the scanning signals which are to reproduce the image. The contrast of the visible output and the corrosion resistance of the recording medium can be improved, as known, by placing a black layer of ink or lacquer beneath the electrosensitive coating in order to permit ready reading of the image which is reproduced.

For recordings which are to be read by transmission of light therethrough, for example in which the light is applied towards the recording carrier from the side of the substrate, or if the recording carrier is to carry information which is to be photographically reproduced, it is desirable to not only make the recording carrier transparent, but also to utilize a transparent lacquer when applying the layer of the lacquer on the substrate. It has also been proposed to utilize a substrate which is uniformly colored, but transparent, for example which is tinted with a color which is particularly appropriate for subsequent copying on paper especially sensitive to the tint color.

The recording methods and the record carriers as known permit reproduction only of black-white images and, to some extent, of intermediate grey tones. The black-content of the intermediate grey tones can be obtained by suitable subdivision of the image to be reproduced into finely adjacent points, or to adjust the size of the burned-out points at any particular location, in order to obtain a grey-tone image similar to the dot pattern used in half-tone image representation in printing methods.

THE INVENTION

It is an object to provide a method of recording and a record carrier which permits reproduction of color images and recording thereof by selective burning-out, under control of electrical signals, of a metalized surface.

Briefly, the recording carrier is so arranged that underneath the electrosensitive coating—typically the metal coating which is removed—a color pattern surface is applied in a multicolor element pattern. Under each and every possible point of removal of the metal coating, groups of individual color elements are placed, in which the color element groups include colored areas, for example ink elements of selected colors. The selected colors may, for example, be the complementary colors including at least two base colors or, similar to color television, include Red, Green, Blue or yellow, green and red in periodic sequence. In order to provide a record of the desired image in its colored aspect, the particular color element of the substrate is exposed by removal by burning-off of the electrosensitive coating above the respective color element; mixed colors are generated by burning off the required color elements to provide the mixed colors, similar to multiple exposure of colored phosphor dots in a color television image tube.

In accordance with a feature of the invention, the electrosensitive coating of the substrate is applied over a surface which is formed as a multicolor element surface which, under any possible area where the electrosensitive coating can be removed, has all the color elements of the elementary groups placed therebeneath.

In accordance with a further feature of the invention, the color elements can be provided by suitably coloring the substrate or carrier or by placing a separate discrete intermediate layer on the substrate or carrier, for example a layer of lacquer placed beneath the electrosensitive layer and the substrate.

The color elements may be circular or oval dots, having their longitudinal axis placed in the direction of the line to be printed; or the longitudinal axis can be transverse to the line axis. The color elements may also be parts of lines running over the entire length of the pattern surface of the carrier. The colored lines may also be grouped and each group of lines may contain all selected colors in the same sequence.

The method and the recording paper in accordance with the present invention have the advantage that colored representations or images, and particularly multicolored images, can be recorded by using the well-known and reliable electrosensitive recording method, with high degree of color and image fidelity and good contrast. The recording system is simple to control, requiring only that any one of the burn-off points of the electrode are placed exactly above the desired color of the color element. This can be obtained comparatively easily by providing, in accordance with a feature of the invention, a control strip or reference marker strip which can be scanned optically, for example, and which provides a reference position for the respective color elements, so that, even if the substrate should shrink or expand under differential temperature and/or humidity conditions, the desired color to be recorded to provide a visible image can still be accurately placed on the record carrier. Placing of the burn-out point on the respectively selected color element or color area is facilitated by placing the color elements in a predetermined, periodically recurring sequence with respect to immediately adjacent groups of color elements.

Single-color reproduction of the information content can be obtained by adjusting the recording stylus and/or the recording carrier at predetermined relative positions with respect to each other. In multicolor recording, particularly when reproducing color pictures or images, it is desirable to control the position of the recording stylus with respect to the recording carrier by additional chroma signals in the form of phasing signals which can be synchronously applied with respect to the recording pulses as such and which control the position of the burn-out spot with respect to the particular color element therebeneath, so that the recording stylus will, when energized by the recording pulse, be placed above the color element which is desired to be reproduced. Similar to color television or multicolor printing, the desired color effect is obtained by additive or subtractive mixing of the color content of the exposed area after burning off of the metalized coating.

DRAWINGS

FIG. 1 is a perspective exploded view of a recording carrier for transmitted light viewing;

FIG. 2 is a perspective exploded view of a recording carrier for incident light viewing;

FIGS. 3, 4 and 5 are greatly enlarged top views of the color dot groupings on the recording carrier, showing different embodiments;

FIG. 7 is a top view of a recording carrier with side maerks, from which representations of the color element groupings have been omitted for clarity.

Figure 6:
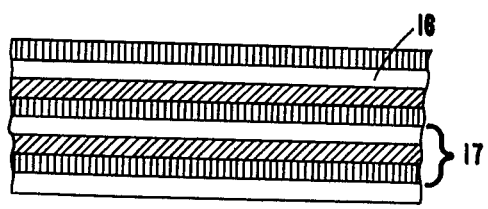
FIG. 6 is a greatly enlarged top view of a pattern surface section having color elements for by lines.

Embodiment of FIG. 1: A substrate 1 of insulating material, for example a plastic such as Mylar, (Reg. TM for oriented polyester film) has a metal film 2 applied thereto, for example by vapor deposition in a vacuum. The substrate 1 is a light transmissive plastic which has a polychrome coloring applied thereto in accordance with the desired multicolor pattern, as will be explained in detail below. This recording carrier is particularly suitable for use in apparatus in which light is directed towards the carrier from the side remote from the viewer, that is, in the direction of the arrow L1.

Embodiment of FIG. 2: A substrate 3, made of any desired electrical insulating material which, preferably, is opaque, such as paper, has a lacquer layer 4 applied thereto. The lacquer layer 4 is a color layer by or on which the multicolor pattern is applied, for example by printing. The lacquer layer 4, that is, the printed color layer, is covered at the top side by a metal film 2, similar to the metal film 2 of FIG. 1, and therefore has been given the same reference numeral. This recording carrier is suitable for direct viewing when placed in an illuminated area as indicated by the arrow L2 which, at the same time, represents incident light and also shows the direction of viewing.

The multicolor pattern applied on the substrates of either FIG. 1 or 2 can have the configuration shown in FIGS. 3–6. The multicolor pattern in accordance with FIG. 3 has essentially circular color dot elements 6, for example having the colors yellow, green and red. For representation on the drawing, the yellow elements have been left blank and circled; the green elements have been supplied with section marks, and the red elements with cross hatching. The color elements 6 are arranged in periodically repetitive groups in the direction of reading of the lines, indicated by the arrow 7. The result is groups 8 of color elements, formed by the elementary dots 6, in which the elements of the same color always have the same relative position with respect to an adjacent color element. The groups 8 of a row are preferably offset with respect to the groups 8 of an adjacent row, so that a spatial distribution of similarly colored elements will be formed in the color pattern. The size of the element 6 is so selected that any one possible burn-out position in the metal film 2 has an elementary group 8 associated therewith.

The color pattern in accordance with FIG. 4 has individual color elements 10 which, however, are not essentially circular but rather are elongated, in the form, essentially, of elongated ellipses, in which the longitudinal axis or elongated dimension extends along the direction of the lines 11.

The pattern in accordance with FIG. 5 also has essentially elongated, for example oval elements 12, having their longitudinal axis or extent transverse to the direction of the line 13.

The arrangement of the patterns of FIGS. 4 and 5 again is formed by individual color dots of three different colors which repeat periodically in each line to form color element groups 14 (FIG. 4) and 15 (FIG. 5). The arrangement of the pattern of FIG. 6 is formed by individual color lines 16 of three different colors which repeat periodically to form color element groups 17. The lines 16 may run parallel to the direction of reading, or they may run across or in any given angle to this direction.

The recording carrier, when looked at from the top, has the appearance of FIG. 7—in which the individual color groups have been omitted for clarity. At the marginal zones 22, 23, extending transversely with respect to the direction of writing, and parallel to the direction of transport of the record carrier with respect to the comb writing read, for example, marginal markers in form lines 24, 25 are provided. The respective distance of the marker lines 25 can correspond to the distance which the elements of the respective colors in a line have from each other. They serve to simplify the selection of the color upon beginning of the recording, but may serve also as reference markers for other purposes. The marker lines 26 at the right-hand side of the margin of the recording paper—assuming writing from left to right—in the metalized region 24 can be used, for example, to provide an output signal which is compared with a signal representative of standard width of the paper in order to determine any deviation of the recording area from a standard area. Such deviation may occur due to stretching of the paper, for example due to moisture or humidity. The marker lines 25, 26 can be sensed optically if placed outside of the metalized range 24 of the recording paper.

Figure 8:
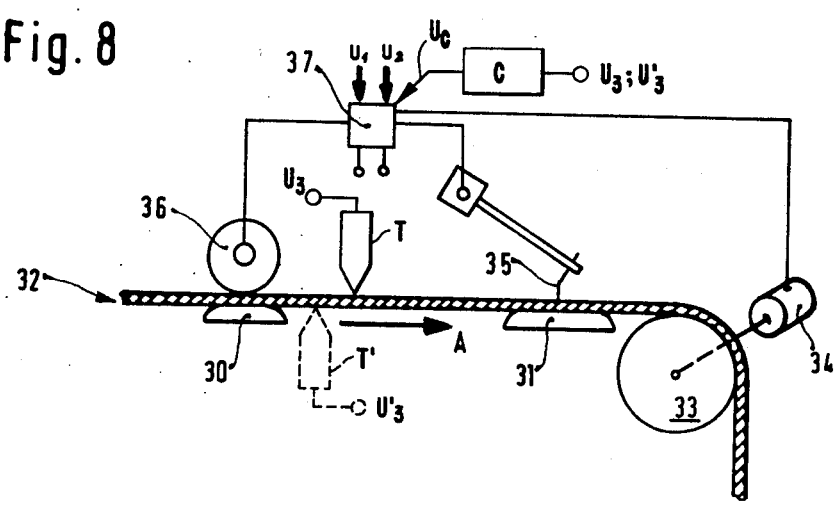
FIG. 8 is a highly schematic view of an arrangement to record multicolor images in accordance with the method.

The apparatus to carry out the process in accordance with the present invention is schematically shown in FIG. 8. Two fixed supports 30, 31 are provided, over which the recording carrier 32, which is flexible and can correspond to either one of the embodiments of FIG. 1 or FIG. 2, is transported by a transport device 33, 34, shown only schematically, being pulled in the direction of the arrow A. The electron sensitive coating of the carrier 32 is engaged in the region of the support 31 by a recording electrode 35. It is engaged in the region of the support 30 by a wide-area counter electrode 36 formed, for example, as a conductive roller riding on the paper and in engagement therewith. The electrodes 35, 36 are connected to a pulse source 37 which is controlled in accordance with writing signals $U_1$ and phase or color position signals $U_2$. The pulse generator 37 also provides control signals to the transport device 33, 34 to longitudinally move the recording carrier 32 in the direction of the arrow A.

The writing signals $U_1$ provide signals to energize the respective electrode 35 to provide a burn-out pulse at a selected instant of time. The phase or color signals $U_2$ are used to so position the respective writing electrode 35 when the appropriate burn-out pulse is received over the recording carrier 32 that the pulse which is generated will make visible the desired specific color element of the color element group beneath the recording stylus.

The side markers 25, 26 can be read by suitable transducers. FIG. 8 shows a transducer T positioned above the recording carrier providing an output signal $U_3$. A similar transducer T' can be placed beneath the recording carrier to, likewise, read the markers if, for example, the substrate is transparent—see FIG. 1. In some cases, only a single transducer may be needed. Transducer T' provides an output signal $U'_3$. These output signals are applied to a control unit C providing a control output signal $U_C$ to adjust the phasing of the signal $U_2$ in case the width of the markers, as sensed by the transducers T, T', deviates from a standard, for example by introducing a slight delay therein. Such a slight delay can be introduced by connecting the signal $U_3$ through a variable capacity capacitor, such as a solid-state capacitor of the varactor type, a delay line, or the like. Any suitable delay circuit may be used. The exact positioning of the writing head with respect to the carrier substrate thus can be obtained by using the side markers. Rather than using separate transducers T, T', the transducers or other arrangements to pick up the markings can also be placed on the recording head. Recording heads with only a single electrode, which moves transversely of the paper, can also be used. The markers, thus, can be suitably sensed and evaluated to correct the precise position of the writing head or, rather, the writing electrode thereof, with respect to the substrate to compensate for any possible changes in area due to moisture or humidity, which might cause relative shifting of the multi-color grouping of color elements with respect to the recording signals being supplied to the recording electrode.

The markers can be applied to sense the position of a specific color in order to facilitate the color selection at the beginning of recording. They can extend beyond the electrosensitive coating of the recording. They can extend beyond the electrosensitive coating of the recording substrate for optical recognition by the transducers, as described.

The reference markers can be used to set the recording head or recording stylus with respect to a selected single color and, upon energization when the stylus passes only over that color, the resulting image will be a single color image of the desired color;

For recording of multicolor images, it may be necessary to expose single but differently colored elements in adjacent groups, or, for composite colors, one or two elements of any specific group in addition to one selected color element; thus a multicolor effect is obtained by which various tones and hues as well as colors can be obtained, similarly to color television by burning-off of the metalizing layer over the specific color elements selected, in accordance with the information to be recorded. When multicolor recording is desired, information regarding both the color and the point where the color is to appear is controlled by the signal $U_1$, for example by an enabling signal when the stylus reaches the specific selected group of color elements, the precise color then being selected by the phasing or chroma signal $U_2$ which permits the enabling signal $U_1$ to provide a burn-out pulse to the stylus over the selected color element or elements, as determined by the color and its hue or tone to be recorded. Again, synchronization can be effected by transducing marker signals derived from the edge of the recording carrier.

The placement of the recording elements can be as selected, and as determined by the eventual reading-out which is desired; in accordance with FIG. 1, the substrate itself can be dyed appropriately with the color elements, or the color elements can be applied on an inherently transparent substrate. The dying, of course, would be in accordance with a pattern, for example as shown in FIGS. 3, 4, 5 or 6 as selected. For direct reading, the arrangement of FIG. 2 is suitable. The recording carrier of either FIG. 1 or FIG. 2, of course, can be arranged to carry the side markers 25, 26 thereon, placed either at the side where the metalized coating is, or on the reverse, or on both sides.

Various changes and modifications may be made, and features described in connection with any one of the embodiments may be used with any of the others, within the scope of the inventive concept.

Thermographic recording paper, and apparatus, to which the present invention relates is described and claimed in:

U.S. Pat. No. 3,831,179, Brill et al;
U.S. Pat. No. 3,936,545, Brill et al;
U.S. Pat. No. 4,143,582, Brill et al; and
U.S. Ser. No. 034,258, Brill et al, filed Apr. 30, 1979, now U.S. Pat. No. 4,241,356, all assigned to the assignee of the present application.

We claim:

1. Method of recording color images on an electrosensitive recording carrier, under control of electrical recording signals ($U_1$, $U_2$) representative of position and color of the images on the carrier, in which the carrier includes an insulating substrate (1, 3);
at least one reference marker element located on the substrate,
a plurality of color elements in form of dots positioned with respect to each other in a predetermined sequence or pattern (8, 14, 15, 17) located on the substrate;
and a metallized layer (2) above the color elements comprising the steps of
sensing the position of the reference marker,
electrically contacting the metallized layer with a writing or recording electrode;
energizing the writing or recording electrode at a time when said writing or recording electrode is above at least one selected color dot and burning off a selected portion of the metallized layer by the writing or recording electrode under control of recording pulses applied to said electrode to expose a respectively selected color dot or dots; and
controlling the recording pulses to be burn off selected portions of the metallized layer above a selected color dot, or dots, when the writing or recording electrode is spaced from the reference marker by a predetermined distance to insure coordination of the recording signals with the position of the respectively selected color dot or dots.

2. Method according to claim 1, wherein the recording substrate is in strip or web form having a first dimension extending in a first direction,
including the step of
relatively moving the substrate and the electrode in a direction transverse to said first direction.

3. Method according to claim 2, wherein the dots of any one color, in sequential writing or recording lines, are offset with respect to each other relative to said first direction and parallel to said first direction.

4. Method according to claim 1, wherein said step of energizing the writing or recording electrode comprises energizing said electrode by a recording signal when the electrode is in alignment with a single color dot for burning off the metallized layer thereabove.

5. Method according to claim 1, wherein said step of energizing the writing or recording electrode comprises energizing said electrode when it is above more than one color dot of a group of color dots to burn off the metallized layer above said more than one color dots.

6. Method according to claim 1, wherein said step of energizing the writing or recording electrode comprises energizing said electrode with a first signal ($U_1$) controlling burning off the metallized layer with respect to a selected group of color dots;
and controlling energization of said electrode with a second chroma or phasing signal which controls the application of said first signal to the writing or recording electrode at a time when said writing or recording electrode is above a selected color dot of a predetermined group of color dots.

7. Recording image carrier for electrosensitive recording, comprising
an insulating substrate (1, 3) and a metallized layer (2) thereon, adapted to be engaged by an electrically energized writing or recording electrode (35) which, when electrically energized, burns off a selected portion of the metallized layer to expose the underlying substrate to form a image of the information content to be recorded by the contrast between the metallized layer and the underlying substrate,
comprising
a multicolor pattern of color dots (6, 10, 12), on the substrate, located in groups (8, 14, 15), beneath the metallized layer (2), said color dots comprising multiple colors for selective burning-off of the metallized layer thereover to provide an image representation of a selected color or a multicolor image representation; and
markers (25, 26) placed on the substrate to permit generation of reference signals for associating the position of any one colored dot with respect to the position of said marker.

8. Recording carrier according to claim 7, wherein the groups of color dots (8, 14, 15) are placed on the carrier in periodically recurring sequence in a predetermined direction.

9. Recording carrier according to claim 7, wherein the substrate is in strip or web form adapted for movement relative to the electrode in a direction parallel to its major extent;
and said color dots are located in groups of recurring sequences of colors in lines extending transversely to said direction.

10. Recording carrier according to claim 9, wherein the color dots of any one color in succeeding lines are offset with respect to each other.

11. Recording carrier according to claim 7, wherein the multicolor pattern comprises at least two basic colors in each group of color elements.

12. Recording carrier according to claim 7, wherein the multicolor dots include the colors yellow, green and red in periodic sequence.

13. Recording carrier according to claim 7, wherein (FIG. 1) the color elements comprise color zones of the substrate (1).

14. Recording carrier according to claim 7, wherein (FIG. 2) the color elements comprise an intermediate layer (4) of color elements applied on the substrate (3).

15. Recording carrier according to claim 7, wherein (FIG. 3) the individual color dots are essentially circular.

16. Recording carrier according to claim 9, wherein the individual color dots are elongated in a direction of the line.

17. Recording carrier according to claim 9, wherein the individual color dots are elongated in a direction transverse to said line.

18. Recording carrier according to claim 7, wherein (FIG. 7) the recording carrier is an elongated element; and said markers (25, 26) comprise lines extending in the direction of the elongation of said elongated element placed at a reserved marker zone adjacent the groups of colored dosts, the lines having a parallel spacing corresponding to the spacing between any selected colored dosts of the groups of the recording carrier.

19. Recording carrier according to claim 18, wherein the reserved zone is an edge zone of the record carrier, and said edge zone is free from the metallized layer (2).

20. Recording carrier according to claim 18, wherein the markers are applied to the side of the substrate opposite the side of the metallized layer.

21. Color recording apparatus
in combination with a recording carrier, said carrier comprising
an insulating substrate (1, 3);
a metallized layer (2) thereon;
and a multi-color pattern of colored dots (6, 10, 12) located in groups (8, 14, 15) beneath the metallized layer (2), said colored dots comprising multiple colors for selective exposure upon burning-off of the metallized layer thereover to provide an image representative of a selected color or a multicolor image representation,
said apparatus comprising
a recording stylus (35) in engagement with the metallized layer (2) on the substrate (1, 3);

means (37) to provide energizing pulses to said electrode (35) to burn off a selected portion of the metallized layer above selected colored dots, sensing means (T, T') sensing a predetermined reference marker on said carrier;

and control means (C) controlling the phasing of application of a color recording signal ($U_1, U_2$) to the electrode to expose at least one predetermined dot, in according with the position of the electrode on the recording carrier with reference to said marker.

22. Apparatus according to claim 21, wherein the controls means comprises means (37) receiving a recording signal and, additionally, receiving a signal ($U_2$) containing color or chroma information to address a particular color for burning-off of the metallized layer over a selected color dot.

23. Method according to claim 2, wherein said color dots are located in recurring sequences of colors on lines extending transversely to said first direction.

* * * * *